United States Patent
Jeon

(10) Patent No.: US 6,607,463 B2
(45) Date of Patent: Aug. 19, 2003

(54) MALFUNCTION DIAGNOSTIC METHOD AND SYSTEM FOR OUTPUT SHAFT RPM SENSOR OF A TRANSMISSION

(75) Inventor: Byeong-Wook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 22 days.

(21) Appl. No.: 10/011,730

(22) Filed: Dec. 11, 2001

(65) Prior Publication Data

US 2002/0082132 A1 Jun. 27, 2002

(30) Foreign Application Priority Data

Dec. 27, 2000 (KR) ........................................ 2000-82948

(51) Int. Cl.$^7$ ............................................. F16H 61/12
(52) U.S. Cl. .......................... 475/254; 701/34; 73/1.37
(58) Field of Search ................................. 475/153, 149, 475/158, 254; 701/34; 477/906; 73/1.37, 1.41, 118.1; 702/145, 116

(56) References Cited

U.S. PATENT DOCUMENTS

| | | | | |
|---|---|---|---|---|
| 4,685,051 A | * | 8/1987 | Hattori et al. | 701/63 |
| 4,693,143 A | * | 9/1987 | Harada et al. | 477/36 |
| 4,849,899 A | * | 7/1989 | Cote et al. | 477/906 |
| 4,928,242 A | * | 5/1990 | Suzuki | 701/34 |
| 4,947,325 A | * | 8/1990 | Iwata et al. | 701/34 |
| 4,967,620 A | * | 11/1990 | Shimanaka | 477/906 |
| 5,855,532 A | * | 1/1999 | Sugiyama | 477/906 |
| 6,086,512 A | * | 7/2000 | Kondo | 477/906 |

* cited by examiner

*Primary Examiner*—Ankur Parekh
(74) *Attorney, Agent, or Firm*—Antonelli, Terry, Stout & Kraus, LLP

(57) ABSTRACT

Disclosed is a malfunction method and system for an output shaft rpm sensor of a transmission. The method comprises the steps of: detecting output shaft rpm of a transmission by the output shaft rpm sensor, and detecting vehicle speed by a vehicle speed sensor; determining whether malfunction conditions, which indicate a malfunction in the output shaft rpm sensor, are satisfied based on the output shaft rpm and the vehicle speed; performing stand-by for a predetermined stand-by time if the malfunction conditions are satisfied; determining whether there is a malfunction in the output shaft rpm sensor using the detected output shaft rpm; and generating malfunction codes if it is determined that there is a malfunction in the output shaft rpm sensor. The system comprises a vehicle state detector for performing detection of various drive states and operations of elements of a vehicle, and outputting corresponding signals, and an ECU for performing the method.

16 Claims, 4 Drawing Sheets

MALFUNCTION DIAGNOSTIC METHOD AND SYSTEM FOR OUTPUT SHAFT RPM SENSOR OF A TRANSMISSION

CROSS-REFERENCE TO RELATED APPLICATION

This application claims priority of Korea patent Application No. 2000-82948, filed on Dec. 27, 2000, the disclosure of which is incorporated by reference herein.

BACKGROUND OF THE INVENTION (a) Field of the Invention

The present invention relates to a malfunction diagnostic method and system for a vehicle speed sensor. More particularly, the present invention relates to a malfunction diagnostic method and system for an output shaft rpm sensor that detects rpm of a transmission output shaft (transfer drive gear).

(b) Description of the Related Art

An electronic control unit (ECU) is typically provided in a vehicle, where it performs engine and transmission control based on vehicle state conditions that are detected by a plurality of sensors such as a vehicle speed sensor. The ECU also monitors operational states of various systems and parts of the vehicle including the sensors, and generates malfunction codes as needed.

One such sensor that is monitored for malfunctions by the ECU is a transmission output shaft rpm sensor (hereinafter referred to as a "PG-B sensor"). The operation of the ECU to determine whether the PG-B sensor is malfunctioning will be described with reference to FIG. 1.

The ECU 160 is connected to a vehicle state detector 100, which performs detection of various drive states and operation of elements, and which outputs corresponding signals to the ECU 160. Among the different sensors included in the vehicle state detector 100 are a vehicle speed sensor 110 for detecting vehicle speed, and a PG-B (pulse generator-B) sensor 120 for detecting rpm of a transmission output shaft. The ECU 160 determines the vehicle speed from the signals output by the vehicle speed sensor 110, and performs conversion of output shaft rpm received from the PG-B sensor 120 into vehicle speed (hereinafter referred to as the "converted vehicle speed") by multiplying the detected output shaft rpm by a predetermined conversion factor.

In the prior art, the PG-B sensor 120 is determined to be malfunctioning if the converted vehicle speed is less than the vehicle speed detected by the vehicle speed sensor 110 by 30% or more. However, the vehicle speed sensor 110 outputs signals of increasingly higher frequencies as the vehicle increases speed, and if noise develops in the signals of the vehicle speed sensor 110, the ECU 160 determines that the vehicle is travelling at a speed greater than its actual speed. In this case, the converted vehicle speed may be determined to be less than the vehicle speed detected by the vehicle speed sensor 110 by 30% or more when, in fact, it is well over 70% of the vehicle speed output by the vehicle speed sensor 110.

Typically, the ECU 120 provides a limp-home mode, in which limited operation of the vehicle is possible when a sensor used for engine/transmission control malfunctions. That is, the transmission is generally maintained in a predetermined shift speed in the limp-home mode. Accordingly, if the PG-B sensor 120 is erroneously determined to be malfunctioning as described above, the ECU 120 performs control into the limp-home mode, causing a great inconvenience to the driver.

SUMMARY OF THE INVENTION

The present invention has been made in an effort to solve the above problems.

It is an object of the present invention to provide a method and system that more precisely determines whether there is a malfunction in an rpm sensor that detects rpm of a transmission output shaft, and which performs shifting into a suitable shift speed in the case where the rpm sensor is determined to be malfunctioning.

To achieve the above object, the present invention provides a malfunction method and system for an output shaft rpm sensor of a transmission. The malfunction diagnostic method comprises the steps of: detecting output shaft rpm of a transmission by the output shaft rpm sensor, and detecting vehicle speed by a vehicle speed sensor; determining whether malfunction conditions, which indicate a malfunction in the output shaft rpm sensor, are satisfied based on the output shaft rpm and the vehicle speed; performing stand-by for a predetermined stand-by time if the malfunction conditions are satisfied; determining whether there is a malfunction in the output shaft rpm sensor using the detected output shaft rpm; and generating malfunction codes if it is determined that there is a malfunction in the output shaft rpm sensor.

The malfunction diagnostic system for an output shaft rpm sensor of a transmission comprises: a vehicle state detector for performing detection of various drive states and operations of elements of a vehicle, and outputting corresponding signals; and an ECU for generating malfunction codes according to the signals output by the vehicle state detector, wherein the vehicle state detector includes a vehicle speed sensor for detecting vehicle speed, and wherein the ECU receives signals of the vehicle speed from the vehicle speed sensor and signals of the output shaft rpm from the output shaft rpm sensor, and determines from the vehicle speed and the output shaft rpm whether malfunction conditions are satisfied. In the case where the malfunction conditions are satisfied and after a predetermined stand-by time has elapsed, the ECU determines whether there is a malfunction in the output shaft rpm sensor using the detected output shaft rpm, after which it generates malfunction codes if the output shaft rpm sensor is malfunctioning.

According to a feature of the present invention, the malfunction conditions are satisfied if the output shaft rpm is greater than or equal to a predetermined rpm, and a rate of reduction in the output shaft rpm is greater than or equal to a predetermined rate of rpm reduction.

According to another feature of the present invention, in the case where the output shaft rpm is greater than or equal to the predetermined rpm and the rate of reduction in the output shaft rpm is less than the predetermined rate of rpm reduction, the malfunction conditions are satisfied if the vehicle speed is greater than a predetermined vehicle speed, if a rate of acceleration of the vehicle speed is less than a predetermined acceleration, and if a converted vehicle speed, which is obtained by converting the output shaft rpm, is less than a predetermined ratio of the vehicle speed.

According to yet another feature of the present invention, the method further comprises the step of detecting a shift speed of the transmission, and the vehicle state detector further includes a shift speed sensor for detecting the shift speed of the transmission, and wherein determining whether the malfunction conditions are satisfied is performed if the shift speed is at a predetermined shift speed(s).

According to still yet another feature of the present invention, it is determined that there is a malfunction in the output shaft rpm sensor if, after the predetermined stand-by time has elapsed, a predetermined condition is satisfied for a duration of a predetermined hold time.

According to still yet another feature of the present invention, the method further comprises the step of detecting turbine rpm, and the vehicle state detector further includes a turbine rpm sensor for detecting rpm of a turbine of a torque converter, and wherein, in the case where the detected vehicle speed is greater than or equal to a predetermined vehicle speed or the turbine rpm is greater than or equal to a predetermined turbine rpm, the predetermined condition is satisfied if the output shaft rpm is less than or equal to a second predetermined rpm.

According to still yet another feature of the present invention, the method further comprises the steps of, and the ECU performs the additional operations of: detecting a frequency of the number of times the malfunction codes are generated; determining if the frequency is greater than or equal to a predetermined frequency; and maintaining the transmission in a predetermined shift speed by outputting shift control signals if the frequency is greater than or equal to the predetermined frequency.

According to still yet another feature of the present invention, the method further comprises the step of detecting a positioning of a shift lever, and the vehicle state detector further includes a shift lever position sensor for detecting a positioning of a shift lever, wherein the predetermined shift speed is a second speed in the case where the shift lever is positioned in a low L range or a low 2 range, and is a third speed in the case where the shift lever is in any other forward range.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein.

DETAILED DESCRIPTION OF THE PREFERRED EMBODIMENTS

Preferred embodiments of the present invention will now be described in detail with reference to the accompanying drawings.

Figure 1:
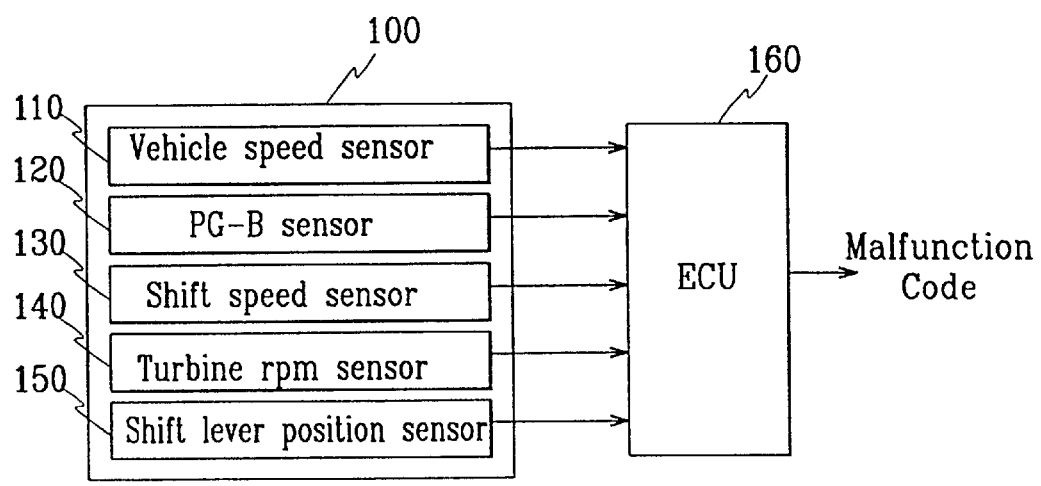
FIG. 1 is a block diagram of a malfunction diagnostic system for an output shaft rpm sensor according to a preferred embodiment of the present invention.

FIG. 1 is a block diagram of a malfunction diagnostic system for an output shaft rpm sensor according to a preferred embodiment of the present invention.

The malfunction diagnostic system according to a preferred embodiment of the present invention includes: a vehicle state detector 100 for performing detection of various drive states and operations of elements, and which outputs corresponding signals; and an ECU 160 for receiving the signals output by the vehicle state detector 100 and performing a malfunction diagnostic method of the present invention based on the received signals.

The vehicle state detector 100 includes a vehicle speed sensor 110 for detecting vehicle speed, an output shaft rpm sensor (hereinafter referred to as a PG-B sensor) 120 for detecting rpm of a transmission output shaft, a shift speed sensor 130 for detecting a present shift speed, a turbine rpm sensor 140 for detecting rpm of a turbine of a torque converter, and a shift lever position sensor 150 for detecting a position of a driver-operated shift lever. The ECU 160 may be realized through a microprocessor, which operates according to a predetermined program.

Figure 2A:
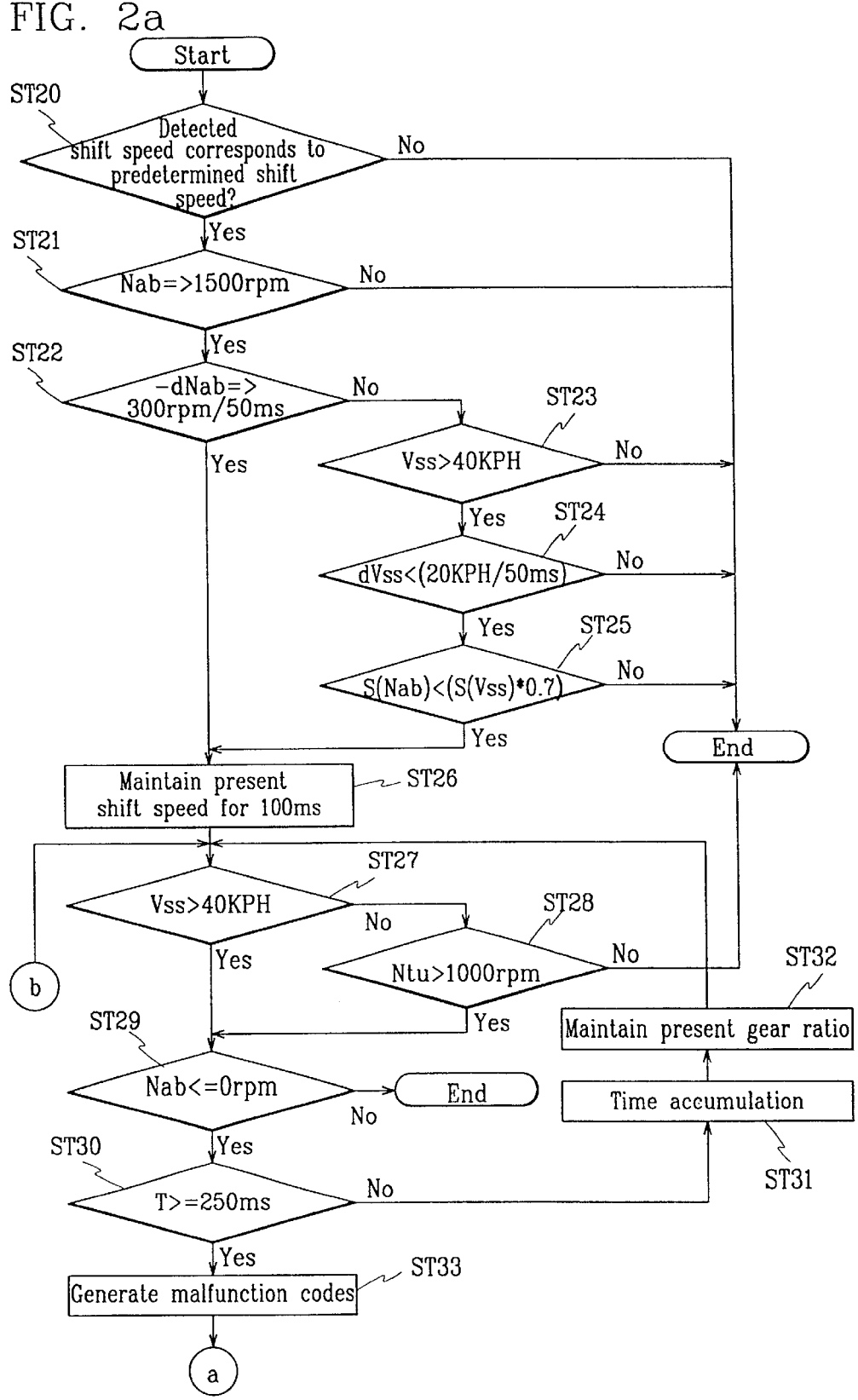
FIGS. 2a and 2b are flow charts of a malfunction diagnostic method for an output shaft rpm sensor according to a preferred embodiment of the present invention.
Figure 2B:
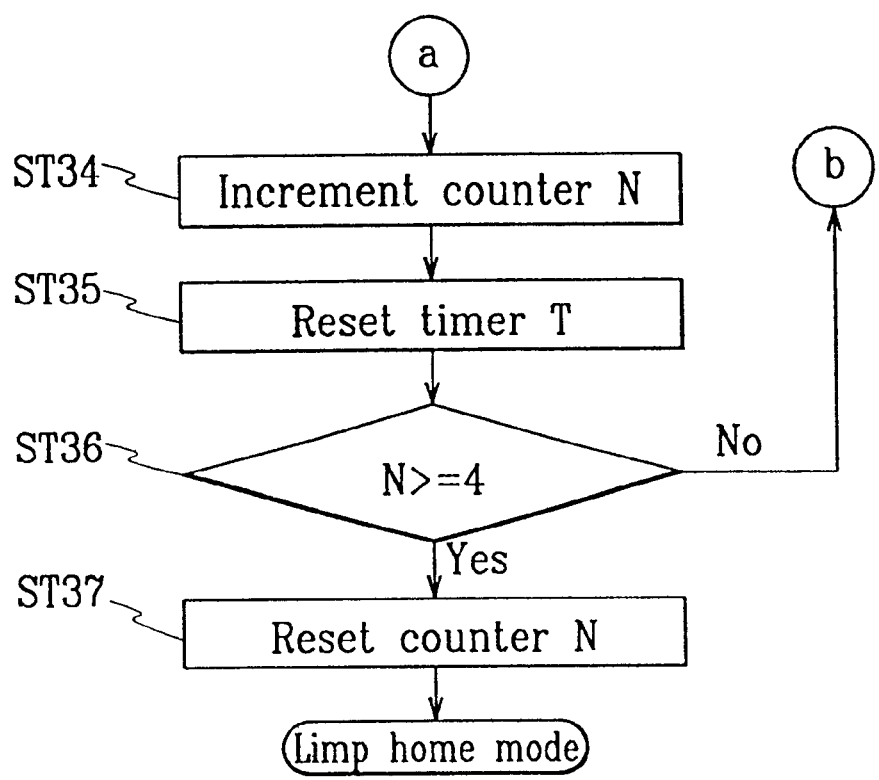
Figure 3:
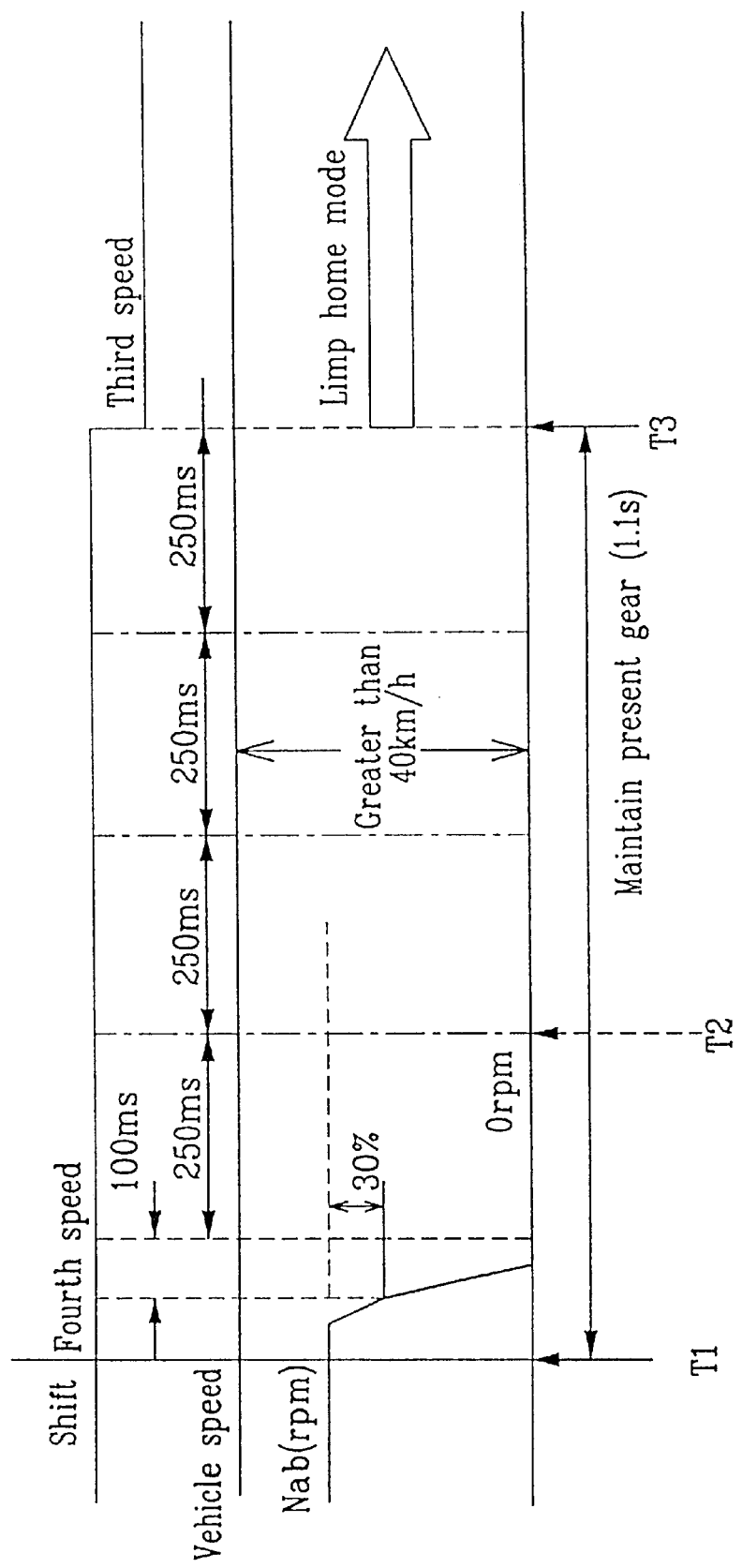
FIG. 3 is a graph showing different stages of operation and detection in relation to time in the method according to a preferred embodiment of the present invention.

FIGS. 2a and 2b show a flow chart of a malfunction diagnostic method for an output shaft rpm sensor according to a preferred embodiment of the present invention, and FIG. 3 is a graph showing different stages of operation and detection in relation to time in the method according to a preferred embodiment of the present invention.

Referring first to FIG. 2a, with the start of the malfunction diagnostic method, a present shift speed is detected and it is determined if the detected shift speed corresponds to a predetermined shift speed in step ST20. Preferably, the predetermined shift speed includes all forward speeds except a first speed. If the detected shift speed corresponds to the predetermined shift speed, it is determined if malfunction conditions are satisfied in steps ST21, ST22, ST23, ST24, and ST25. If any one of these conditions is not satisfied, the process is ended. The determination of whether the malfunction conditions are satisfied is made by the ECU 20 and is based on predetermined rpm, a predetermined rate of rpm reduction, a predetermined vehicle speed, a predetermined acceleration, and a predetermined error ratio.

In more detail, after receiving signals from the vehicle state detector 100, the ECU 160 determines if output shaft rpm Nab detected by the PG-B sensor 120 is greater than or equal to the predetermined rpm in step ST21. If the output shaft rpm Nab detected by the PG-B sensor 120 is greater than or equal to the predetermined rpm, the ECU 160 determines if a rate of rpm reduction −dNab is greater than or equal to the predetermined rate of rpm reduction in step ST22. Preferably, the predetermined rpm is 1500 rpm and the predetermined rate of rpm reduction is −300 rpm per 50 ms.

Subsequently, if the rate of rpm reduction −dNab is less than the predetermined rate of rpm reduction, the ECU 160 determines if a vehicle speed Vss detected by the vehicle speed sensor 110 is greater than the predetermined vehicle speed in step ST23. If the vehicle speed Vss is greater than the predetermined vehicle speed, the ECU 160 determines if a rate of acceleration dVss of the vehicle speed Vss is less than the predetermined acceleration in step ST24. The predetermined vehicle speed and the predetermined acceleration are preferably 40 km/h and 20 km/h per 50 ms, respectively.

In step ST24, if the rate of acceleration dVss is less than the predetermined acceleration, the ECU 160 determines whether a difference between a converted vehicle speed S(Nab), which is obtained by converting the output shaft rpm Nab detected by the PG-B sensor 120, and a vehicle speed S(Vss) calculated from the vehicle speed Vss detected by the vehicle speed sensor 110 is as great as the predetermined error ratio in step ST25. It is preferable that the error ratio is 30%, in which case the equation used in this step becomes $S(Nab) < S(Vss) * 0.7$.

If it is determined that the rate of rpm reduction −dNab is greater than or equal to the predetermined rate of rpm reduction in step ST22, or if the equation $S(Nab) < S(Vss)$ is satisfied in step ST25, the ECU 160 maintains the present shift speed for a predetermined stand-by time in step ST26. Preferably, the predetermined stand-by time is 100 ms.

With reference to FIG. 3, when driving in a fourth speed, if the PG-B sensor 16 experiences a malfunction such as a disconnection at point T1, the output shaft rpm Nab, signals of which are supplied to the ECU 160, begins to decrease. With a continued reduction in the output shaft rpm Nab, the vehicle speed corresponding to the output shaft rpm Nab reaches a level where it is less than the vehicle speed Vss by the error ratio of 30%. To better determine the direction of changes in output shaft rpm Nab (i.e., whether it is increasing or decreasing) detected by the PG-B sensor 120, standby is performed for 100 ms.

After this time has elapsed, the ECU 160 generates malfunction codes according to whether predetermined malfunction conditions are satisfied. It is preferable that the determination of whether the malfunction conditions are satisfied is based on the predetermined vehicle speed, predetermined turbine rpm, and a predetermined hold time.

In more detail, to determine whether the malfunction conditions are satisfied, the ECU 160 first determines whether the vehicle speed Vss detected by the vehicle speed sensor 110 has exceeded the predetermined vehicle speed (e.g., 40 km/h) in step ST27. If the vehicle speed Vss has not exceeded the predetermined vehicle speed, the ECU 160 determines if turbine rpm Ntu is greater than the predetermined turbine rpm in step ST28. Preferably, the predetermined turbine rpm is 1000 rpm.

If the vehicle speed Vss has exceeded the predetermined vehicle speed in step ST27 or the turbine rpm Ntu is greater than the predetermined rpm in step ST28, the ECU 160 determines if the output shaft rpm Nab detected by the PG-B sensor 16 is either equal to 0 rpm or has a negative value in step ST29. If the output shaft rpm Nab is less than or equal to 0 rpm, the ECU 160 determines if a time T is greater than or equal to the predetermined hold time in step ST30. It is preferable that the predetermined hold time is 250 ms and that the time T starts the moment step ST27 begins.

If the time T is less than the predetermined hold time, the ECU 160 continues the elapse of the time T in step ST31 and maintains the present gear ratio in step ST32, after which the process is returned to step ST27. However, if the time T is greater than or equal to the predetermined hold time in step ST30, the ECU 160 generates the predetermined malfunction codes in step ST33. The point at which the malfunction codes are generated corresponds to the point at which 250 ms have elapsed starting from the end of the predetermined hold time. This is designated by point T2 in FIG. 3.

Following the generation of the malfunction codes, the ECU 160, with reference to FIG. 2b, increments a counter N in step ST34. The counter N indicates the number of times malfunctions have occurred. Next, the ECU 160 resets a timer in step ST35, thereby initializing the time T. After step ST35, the ECU 160 determines if the value of the counter N is greater than or equal to a predetermined frequency number in step ST36. Preferably, the predetermined frequency number is four (4). If the value of the counter N is less than the predetermined frequency number, the process is returned to step ST27 such that the malfunction codes are again generated, following the satisfaction of the necessary conditions. However, if the value of the counter N is greater than or equal to the predetermined frequency number, the ECU 20 resets the counter N in step ST37.

After the counter N is reset, the ECU 20 activates a limp-home mode. The limp-home mode acts as a backup that can be activated by the ECU 160 in the case where detection signals are not generated, which occurs when there is a malfunction in a system or device of the vehicle. That is, the ECU 160 activates the limp-home mode to generate signals that substitute for signals of the malfunctioning system or device. Accordingly, the vehicle remains operable such that it may be driven to a location for repairs. With the activation of the limp-home mode in the preferred embodiment of the present invention, if the PG-B sensor 120 malfunctions, the ECU 160 outputs substitute detection signals of the PG-B sensor 120, thereby allowing continued operation of the vehicle.

Preferably, when the limp-home mode is activated, the ECU 160 maintains a third speed in the case where the shift lever is positioned at a drive D range or a low 3 range, and maintains a second speed in the case where the shift lever is positioned at a low 2 range or a low L range. Therefore, in the limp-home mode, as long as the ignition key is not operated to turn the vehicle off or the position of the shift lever is not changed, the transmission is held in the second or third speed and shifting into other speeds is not performed.

The moment the limp-home mode is activated corresponds to point T3 of FIG. 3, which is the point at which an interval of 250 ms*4 has elapsed following the completion of step ST26 of maintaining the present shift speed for the predetermined duration of time. Accordingly, starting from the point where the output shaft rpm Nab detected by the PG-B sensor 16 begins to decrease, the shift speed that the vehicle is in at point T1 is maintained for a total of 1.1 s.

In the above, if any one of the conditions of steps ST21, ST23, ST24, ST25, ST28, and ST29 is not satisfied, the malfunction diagnostic process is ended. That is, if the conditions of these steps are not satisfied, this indicates that the corresponding sensor is operating normally and so further diagnosis is not required.

In the malfunction diagnostic method for an output shaft rpm sensor of the present invention described above, the possibility of a mis-diagnosis of a malfunction in the PG-B sensor is greatly reduced such that overall malfunction diagnostic performance is improved. This prevents taking the vehicle in for unneeded servicing. Further, the possibility of mis-diagnosis is reduced without requiring an additional sensor(s) such that the overall number of parts is minimized.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A malfunction diagnostic method for an output shaft rpm sensor of a transmission for a vehicle comprising the steps of:

detecting output shaft rpm of a transmission by the output shaft rpm sensor, and detecting vehicle speed by a vehicle speed sensor;

determining whether malfunction conditions, which indicate a malfunction in the output shaft rpm sensor, are satisfied based on the output shaft rpm and the vehicle speed;

performing stand-by for a predetermined stand-by time if the malfunction conditions are satisfied;

determining whether there is a malfunction in the output shaft rpm sensor using the detected output shaft rpm; and generating malfunction codes if it is determined that there is a malfunction in the output shaft rpm sensor.

2. The method of claim 1 wherein the malfunction conditions are satisfied if the output shaft rpm is greater than or equal to a predetermined rpm, and a rate of reduction in the output shaft rpm is greater than or equal to a predetermined rate of rpm reduction.

3. The method of claim 2 wherein in the case where the output shaft rpm is greater than or equal to the predetermined rpm and the rate of reduction in the output shaft rpm is less than the predetermined rate of rpm reduction, the malfunction conditions are satisfied if the vehicle speed is greater than a predetermined vehicle speed, if a rate of acceleration of the vehicle is less than a predetermined acceleration, and if a converted vehicle speed, which is obtained by converting the output shaft rpm, is less than a predetermined ratio of the vehicle speed.

4. The method of claim 1 further comprising the step of detecting a shift speed of the transmission, and wherein the step of determining whether the malfunction conditions are satisfied is performed if the shift speed is at a predetermined shift speed(s).

5. The method of claim 1 wherein it is determined that there is a malfunction in the output shaft rpm sensor if, after the elapse of the predetermined stand-by time, a predetermined condition is satisfied for a duration of a predetermined hold time.

6. The method of claim 5 further comprising the step of detecting turbine rpm, and wherein, in the case where the detected vehicle speed is greater than or equal to a predetermined vehicle speed or the turbine rpm is greater than or equal to a predetermined turbine rpm, the predetermined condition is satisfied if the output shaft rpm is less than or equal to a second predetermined rpm.

7. The method of claim 1 further comprising the steps of:
   detecting a frequency of the number of times the malfunction codes are generated;
   determining if the frequency is greater than or equal to a predetermined frequency; and
   maintaining the transmission in a predetermined shift speed by outputting shift control signals if the frequency is greater than or equal to the predetermined frequency.

8. The method of claim 7 further comprising the step of detecting a positioning of a shift lever, and wherein the predetermined shift speed is a second speed in the case where the shift lever is positioned in a low L range or a low 2 range, and is a third speed in the case where the shift lever is in any other forward range.

9. A malfunction diagnostic system for an output shaft rpm sensor of a transmission comprising:
   a vehicle state detector for performing detection of various drive states and operations of elements of a vehicle, and outputting corresponding signals; and
   an ECU for generating malfunction codes according to the signals output by the vehicle state detector,
   wherein the vehicle state detector includes a vehicle speed sensor for detecting vehicle speed, and wherein the ECU receives signals of the vehicle speed from the vehicle speed sensor and signals of the output shaft rpm from the output shaft rpm sensor, and determines from the vehicle speed and the output shaft rpm whether malfunction conditions are satisfied, and, in the case where the malfunction conditions are satisfied and after a predetermined standby time has elapsed, determines whether there is a malfunction in the output shaft rpm sensor using the detected output shaft rpm, after which the ECU generates malfunction codes if the output shaft rpm sensor is malfunctioning.

10. The system of claim 9 wherein the malfunction conditions are satisfied if the output shaft rpm is greater than or equal to a predetermined rpm, and a rate of reduction in the output shaft rpm is greater than or equal to a predetermined rate of rpm reduction.

11. The system of claim 10 wherein in the case where the output shaft rpm is greater than or equal to the predetermined rpm and the rate of reduction in the output shaft rpm is less than the predetermined rate of rpm reduction, the malfunction conditions are satisfied if the vehicle speed is greater than a predetermined vehicle speed, if a rate of acceleration of the vehicle is less than a predetermined acceleration, and if a converted vehicle speed, which is obtained by converting the output shaft rpm, is less than a predetermined ratio of the vehicle speed.

12. The system of claim 9 wherein the vehicle state detector further includes a shift speed sensor for detecting a shift speed of the transmission, and wherein the ECU determines that the malfunction conditions are satisfied if the shift speed is at a predetermined shift speed(s).

13. The system of claim 9 wherein the ECU determines that there is a malfunction in the output shaft rpm sensor if, after the elapse of the predetermined stand-by time, a predetermined condition is satisfied for a duration of a predetermined hold time.

14. The system of claim 13 wherein the vehicle state detector further includes a turbine rpm sensor for detecting rpm of a turbine of a torque converter, and wherein, in the case where the detected vehicle speed is greater than or equal to a predetermined vehicle speed or the turbine rpm is greater than or equal to a predetermined turbine rpm, the predetermined condition is satisfied if the output shaft rpm is less than or equal to a second predetermined rpm.

15. The system of claim 9 wherein the ECU detects a frequency of the number of times the malfunction codes are generated, and if the frequency is greater than or equal to a predetermined frequency, maintains the transmission in a predetermined shift speed by outputting shift control signals.

16. The system of claim 15 wherein the vehicle state detector further includes a shift lever position sensor for detecting a positioning of a shift lever, and wherein the predetermined shift speed is a second speed in the case where the shift lever is positioned in a low L range or a low 2 range, and is a third speed in the case where the shift lever is in any other forward range.

* * * * *